(12) United States Patent
Boyer et al.

(10) Patent No.: US 9,308,690 B2
(45) Date of Patent: Apr. 12, 2016

(54) FABRICATION OF OBJECTS WITH ENHANCED STRUCTURAL CHARACTERISTICS

(71) Applicants: Hugo Boyer, Brooklyn, NY (US); Ariel Douglas, Brooklyn, NY (US); Nathaniel B. Pettis, Brooklyn, NY (US)

(72) Inventors: Hugo Boyer, Brooklyn, NY (US); Ariel Douglas, Brooklyn, NY (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 487 days.

(21) Appl. No.: 13/624,067

(22) Filed: Sep. 21, 2012

(65) Prior Publication Data

US 2014/0039659 A1  Feb. 6, 2014

Related U.S. Application Data

(60) Provisional application No. 61/677,749, filed on Jul. 31, 2012.

(51) Int. Cl.
*G06F 19/00* (2011.01)
*B29C 67/00* (2006.01)
*B33Y 40/00* (2015.01)
*B33Y 10/00* (2015.01)

(52) U.S. Cl.
CPC ......... *B29C 67/0051* (2013.01); *B29C 67/0055* (2013.01); *B33Y 40/00* (2014.12); *B33Y 10/00* (2014.12)

(58) Field of Classification Search
CPC ............... B29C 67/0051; G05B 2219/32189; G05B 2219/49008; G06F 17/50; G06F 17/5018; A61F 2002/30943; A61F 2002/30952; A61F 2002/30955
USPC .............. 703/1, 2; 700/31, 98, 117, 118, 119, 700/120, 182
See application file for complete search history.

(56) References Cited

U.S. PATENT DOCUMENTS

| | | | | |
|---|---|---|---|---|
| 5,824,250 | A * | 10/1998 | Whalen et al. | 264/219 |
| 6,214,279 | B1 * | 4/2001 | Yang et al. | 264/482 |
| 6,898,477 | B2 * | 5/2005 | Loughran | 700/119 |
| 7,203,628 | B1 * | 4/2007 | St. Ville | 703/1 |
| 8,660,825 | B2 * | 2/2014 | Kumar | 703/2 |
| 2002/0125592 | A1 * | 9/2002 | Schulman et al. | 264/16 |
| 2003/0165655 | A1 * | 9/2003 | Coe | 428/64.2 |
| 2005/0038549 | A1 * | 2/2005 | Loughran | 700/119 |
| 2007/0233298 | A1 * | 10/2007 | Heide et al. | 700/98 |
| 2009/0306801 | A1 * | 12/2009 | Sivak et al. | 700/98 |
| 2010/0124601 | A1 * | 5/2010 | Ota et al. | 427/8 |

(Continued)

OTHER PUBLICATIONS

"3D FUNPOD", http://phlatboyz.blogspot.com/2012/02/3d-printed-micro-3d-3d-funpod-3d-funpod.html Feb. 8, 2012, pp. 1-3.

(Continued)

*Primary Examiner* — Darrin Dunn
(74) *Attorney, Agent, or Firm* — Strategic Patents, P.C.

(57) ABSTRACT

A source model describing a modeled object is identified. A preliminary fabrication model is automatically identified from the source model. A structural analysis of the fabrication model is automatically performed, resulting in the identification of a critical point and a corresponding failure mode at the critical point. The preliminary fabrication model is automatically modified to adjust the structural integrity of the modeled object with respect to the failure mode at the critical point, thereby producing an updated fabrication model. The object is printed on a three dimensional printer using the updated fabrication model.

27 Claims, 8 Drawing Sheets

(56) References Cited

U.S. PATENT DOCUMENTS

| | | | |
|---|---|---|---|
| 2010/0152873 A1* | 6/2010 | Dunne et al. | 700/98 |
| 2010/0191360 A1* | 7/2010 | Napadensky et al. | 700/98 |
| 2011/0087350 A1* | 4/2011 | Fogel et al. | 700/98 |
| 2011/0276166 A1* | 11/2011 | Atanasoff | 700/104 |
| 2012/0053716 A1* | 3/2012 | Bickel et al. | 700/98 |

OTHER PUBLICATIONS

"Ultra-Bot 3D Printer, William Steele", http://www.kickstarter.com/projects/wjsteele/ultra-bot-3d-printer/posts/362119 Dec. 4, 2012, pp. 1-17.

\* cited by examiner

FABRICATION OF OBJECTS WITH ENHANCED STRUCTURAL CHARACTERISTICS

RELATED APPLICATIONS

This application claims the benefit of U.S. App. No. 61/677,749 filed on Jul. 31, 2012, the entire content of which is hereby incorporated by reference.

BACKGROUND

Three dimensional printers can use many and varied techniques to make a physical object from a computer model. In general, the computer model is converted to a fabrication-ready representation containing tool instructions for a printer to arrange a build material into the physical object. But this transformation from the computer model to the physical object is an imperfect one, subject as it is to the peculiarities of the particular fabrication processes that are used. While the outside appearance is generally well preserved, the interior spaces may be filled with a variety of relatively arbitrary structures with little regard for the structural integrity of the resulting object. This works fine in many circumstances. But where the physical object is destined for functional rather than aesthetic ends—a machine gear instead of a display piece—the geometry of the fabrication-ready representation might contain structural deficiencies that render the physical object unsuitable for its intended purpose. There remains a need for structural analysis in the process of converting three-dimensional models to fabrication-ready representations.

SUMMARY

In general, in one aspect, printing an object includes identifying a source model describing a modeled object; automatically identifying a preliminary fabrication model from the source model, the preliminary fabrication model describing the modeled object; automatically performing a structural analysis on the fabrication model, the structural analysis resulting in the identification of a critical point and a corresponding failure mode at the critical point; automatically modifying the preliminary fabrication model to adjust the structural integrity of the modeled object with respect to the failure mode at the critical point, thereby producing an updated fabrication model; and printing the object on a three dimensional printer using the updated fabrication model.

Implementations may have one or more of the following features: identifying the preliminary fabrication model includes using an algorithm to fill voids in the source model. Identifying the preliminary fabrication model includes accounting for physical properties of the object that are not accounted for in the source model. Identifying the preliminary fabrication model accounts for physical properties resulting from at least one manufacturing technique selected from the group consisting of fused deposition modeling, multijet printing, stereolithography, digital light processor printing, and selective laser sintering. Modifying the preliminary fabrication model includes modifying an infill pattern of one or more voids. Modifying the infill pattern includes adjusting an infill density. Modifying the infill pattern includes altering the infill geometry. Modifying the preliminary fabrication model includes adding a support structure. Modifying the preliminary fabrication model includes modifying a number of shells used to fabricate a portion of the modeled object.

The above aspects can be expressed in a variety of embodiments, including methods, systems, non-transitory computer readable media, articles of manufacture, or other forms.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a series of two dimensional paths to form a three-dimensional object from a digital model, it will be understood that numerous additive fabrication techniques are known in the art including without limitation multijet printing, stereolithography, Digital Light Processor ("DLP") three-dimensional printing, selective laser sintering, and so forth. Any such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
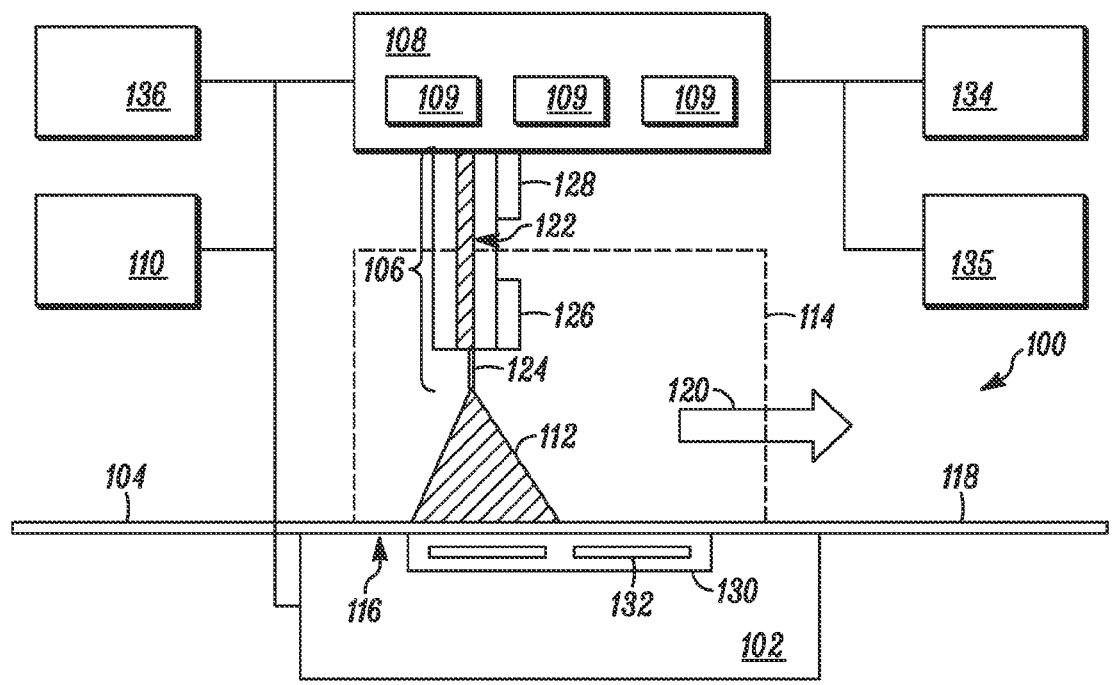
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

In general, the above system can build a three-dimensional object by depositing lines of build material in successive layers—two-dimensional patterns derived from the cross-sections of the three-dimensional object. As described below, three-dimensional printing may be augmented with the acquisition of three-dimensional data, e.g., from a rotating build platform and a laser line scanner.

In general, a fabrication process may begin with a three-dimensional model such as a polygonal mesh (e.g., for STL files), and proceed to create a ready-for fabrication representation of the three-dimensional model. This may include an exterior surface of an object and an infill that fills void space enclosed by the exterior surface. In existing techniques, the infill is deterministically created by applying a fixed or variable geometry to the void space, either in two-dimensional slices (e.g., for fused deposition modeling or the like) or for three-dimensional volumes. This approach may reduce computational complexity when creating tool path information to fabricate the object. However, as rapid prototyping is increasingly used for functional parts (as distinguished from fit and form analysis), optimizing for stress and deformation will become increasingly important. There remains a need for intelligent infilling according to structural characteristics of a fabricated object.

In one aspect, simulation or other structural analysis may be employed to identify areas of a fabricated object that may require additional strength (or which can similarly tolerate less structural strength than a default infill provides), or similarly to apply criteria such as resistance to deformation, strength along one or more axes, and so forth.

Simulation may be performed on a source model such as a triangular mesh. This approach advantageously uses the pre-existing model, where edges of the mesh can be treated as springs and vertices of the mesh as connection points between spring ends. In this configuration, various test loads or other analyses can be applied to determine regions of weakness, flexibility, stiffness, and so forth. Where material properties of a fabricated object are known, it may also be possible to predict fracture conditions. Using this information, infilling may be applied (e.g., by increasing density of infill) to reinforce points of high stress, weakness, or potential mechanical failure.

In another aspect, the mesh may be simplified in order to correspondingly simplify structural analysis. Numerous other techniques are known in the art for mechanical and/or structural analysis, any of which may be usefully employed to identify areas of potential weakness where infilling density might usefully be increased or other structural reinforcement might usefully be provided such as use of alternative (higher strength) build materials or the use of multiple shells or use of materials that can be variably cured to different hardnesses. Highly detailed models might be employed. For example, for layers of a fused deposition modeling process, the bond strength between adjacent layers may be significantly less than the tensile strength of extruded build material. In these circumstances, the object model used for simulation might usefully include a complete length of extruded material for a build in order to capture resulting mechanical characteristics. In another aspect, an infilled model might be simulated (rather than the source polygonal mesh) directly in order to evaluate the structural characteristics of a model having a particular infill. Accordingly, a finite element analysis or the like might be applied to a voxelization of, e.g., a source polygonal mesh model, a representation of an infilled, fabricated object, or any other digital model representing an object. In one aspect, voxels might be usefully sized to correspond to deposition layers of a fused deposition modeling process so that the bond between adjacent layers can be modeled independently of material strength along a path in a layer.

A variety of software tools are available that might suitably be adapted to structural analysis as contemplated herein. For example, numerous physics engines are available (e.g., for game development) that provide appropriate analytical environments, and graphics processing units and similar hardware are well suited to efficiently process this type of data. In addition, simulations may be presented within a graphical user interface so that, for example, a user can interactively apply various loads or other test conditions to a model of an object.

In another aspect, structural simulations may usefully be employed to determine, e.g., an amount of raft or other underlying structure for a build based upon a holding force provided by an initial layer of build material on a build platform, an amount or thermally induced stress, and so forth.

More generally, a variety of structural analyses may be performed on a digital model of an object intended for fabrication, and the results of such analyses may be used to intelligently select infilling (or other structural reinforcements) for a fabricated object to achieve structural or design goals for the object.

Figure 2:
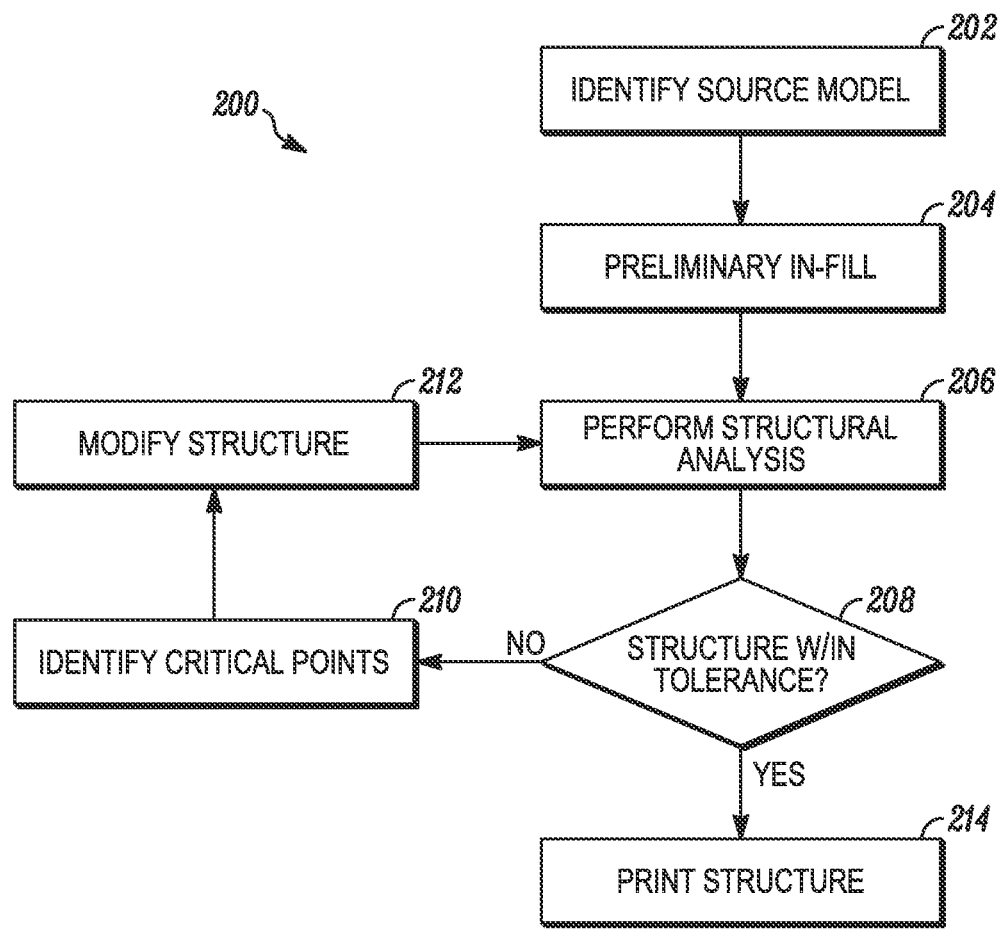
FIG. 2 is a flowchart for fabricating an object.

FIG. 2 is a flowchart for fabricating an object according to these techniques. The process 200 begins by identifying a source model (step 202). The source model can be formatted in any way capable of being converted to fabrication instructions for a three dimensional printer; for example, STL files, CAD files, etc. In some implementations, the source model can be tool instructions such as g-code resulting from such a conversion. The source model provides a three dimensional representation of at least an outer surface of an object, but in some implementations may also provide a representation of interior configuration of the object. In some implementations, the representation includes one or more voids in the object.

In step 202, a preliminary infill is identified. The preliminary infill provides a representation of how to fill voids (if any) in the object as represented by the source model. In some implementations, the preliminary infill can be identified based on a relatively simple algorithm that does not account for the mechanical properties of the resultant object. In some implementations, the preliminary infill can be explicitly identified in the source model itself In some implementations, the preliminary infill can be determined in accordance with U.S. patent application Ser. No. 13/477,998 filed on May 22, 2012, the entirety of which is hereby incorporated by reference. The preliminary infill may include an "empty infill," in which a void is left as a void.

The model that describes the object of the source model, but with the preliminary infill included, is referred to as a preliminary fabrication model. In some implementations, the preliminary fabrication model is stored in memory of a computer performing step 206, below. In some implementations, the preliminary fabrication model is written to non-volatile storage (e.g., a hard disk) so that it may be accessed later or shared with others.

In step 206, a structural analysis is performed on the preliminary fabrication model. The structural analysis can include any of the foregoing analyses, or any other structural analysis that may determine likely points of failure of in the printed object under mechanical or other loads, as well as the types or magnitudes of mechanical loads that produce that corresponding failure. Such failure can occur, for example, by buckling, fracture, tearing, excess deformation, excess shear, excess stress, excess strain, etc.

Figure 3:
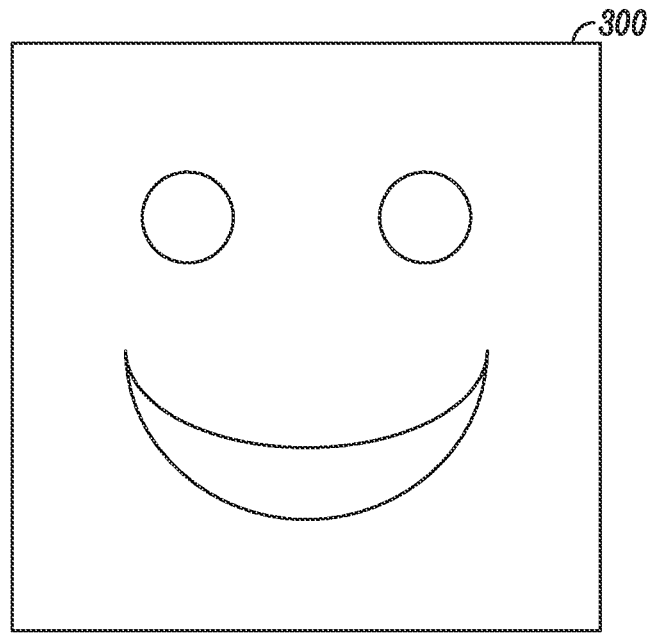
FIG. 3 shows an idealized structure and an exemplary corresponding structure formed via fused deposition modeling.
Figure 3:
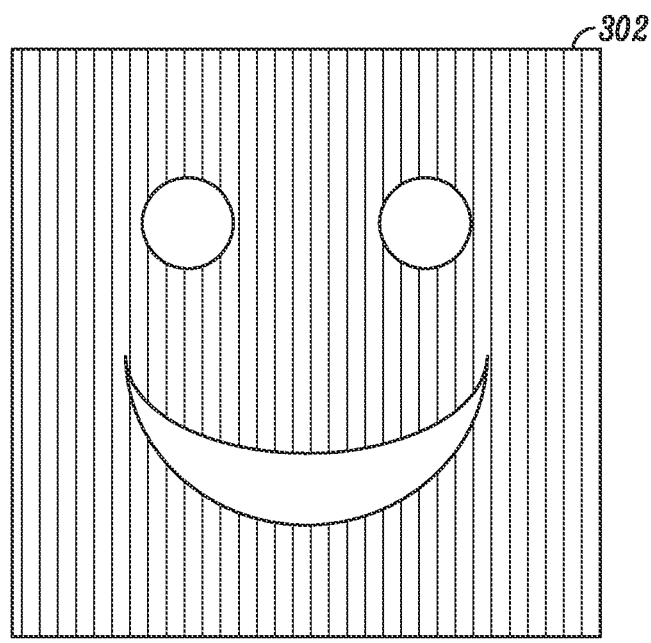

The structural analysis may be performed on a model of the object at various degrees of idealization, as noted above. For example, surfaces or structures in the object may be modeled as idealized mathematical surfaces or structures. However, such models or analyses may not take in to account the physical properties that result from the actual fabrication process. For example, fused deposition modeling involves extruding a bead of build material that bonds to itself in various ways to form the desired object. FIG. 3 shows, for example, an idealized structure 300 and an exemplary corresponding structure 302 formed with fused deposition manufacturing techniques. In general, physical characteristics resulting from such self-bonds may deviate from physical characteristics of an idealized surface or structure. For example, if the self-bonds are weaker than the tensile strength of the build material itself, then structure 302 is more susceptible to failure from stress in a horizontal direction than stress in a vertical direction. This asymmetry may not be captured in the idealized structure 300. The structural analysis of step 206 may take into account these self-bonds, or other physical characteristics resulting from the particular manner of manufacture.

Referring back to FIG. 2, at decision 208, it is determined whether the object is within a desired tolerance; that is, whether it is acceptable for the particular failure(s) identified in step 206 to occur under the particular loads. The desired tolerance can be determined from any source, including (but not limited to) the source model or preliminary fabrication model, interactively (e.g., by prompting a user of the three-dimensional printer, a designer of the model, or another person), by reference to a default value, etc.

If the object is not within a desired tolerance, then critical points are identified based on the structural analysis (step 210). These are points where failure is likely to occur first under a particular load. Consequently, these are points near which strengthening the structure may have the most advantageous effect.

In step 212, the preliminary fabrication model is modified to improve the structural integrity of the objects at the critical points. Such modification may include one or more of: increasing the density of build material near the critical point by employing a finer infill pattern or a different infill geometry; using a greater number of shells to fabricate a portion of the object; adding one or more support structures to the object; or others.

In some implementations, a user may accept or reject modifications. For example, the details of how a void is filled may not matter to a user who is concerned only with the surface appearance of an object. Thus, in such a situation a user is likely to accept modifications that do not produce any visible changes. However, a user who requires the surface appearance of the object to be exactly as specified by the model may reject modifications in which external support structures are employed.

After modifying the model, the process 200 loops back to a subsequent structural analysis (step 206), possibly iterating the loop 208-210-212-208 several times.

When the modeled object eventually meets the desired tolerance (or when no further modifications are possible), the resulting model is referred to as an updated fabrication model. The updated fabrication model may be stored in any location. In some implementations, the updated fabrication model is stored in the memory of a computer performing the process 200. In some implementations, the updated fabrication model is stored on non-volatile storage (e.g., a hard disk) so that it may be retrieved for later use or shared with others. If the modeled object does not meet the desired tolerance but no further modifications are possible, the user is informed as such, and is given the option to cancel the printing.

Finally, once the modeled object meets the desired tolerance (or if the user otherwise does not cancel the printing) the object is printed from the updated fabrication model (step 214).

Figure 4:
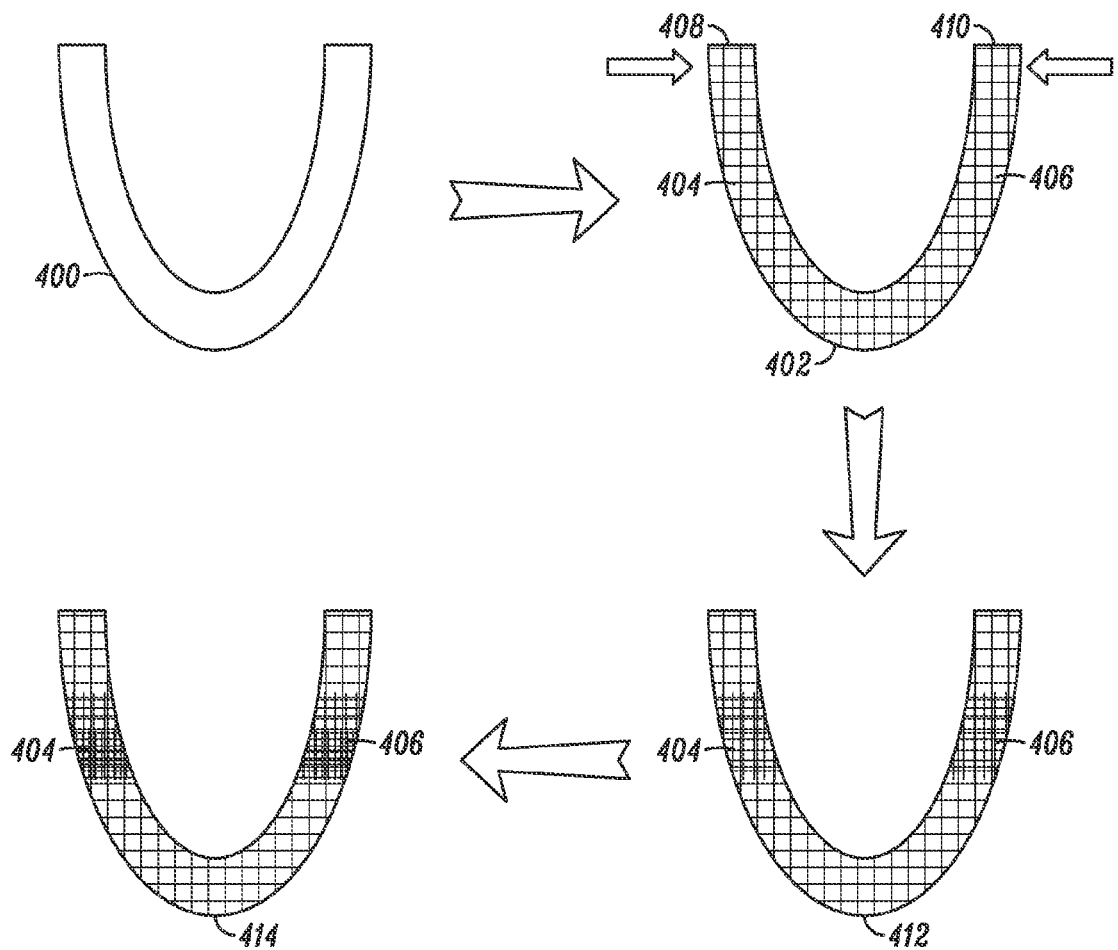
FIGS. 4-7 illustrate exemplary instances of printing an object.

FIG. 4 shows an exemplary instance of printing an object according to the techniques described in FIG. 2. In this example, the source model 400 describes an object having no specified infill. The object, shown as a cross-section in FIG. 3, has the shape of a horse-shoe. A straightforward preliminary infill in the form of a polygonal mesh of uniform density is added, giving rise to a preliminary fabrication model 402.

However, a structural analysis may reveal that the object of the preliminary fabrication model 402 may be in danger of failure at the critical points 404, 406 when loads are applied in the direction of the arrows at endpoints 408, 410. If the load required to produce the failure is outside the tolerance range, an updated fabrication model 412 with increased density near the critical points 404, 406 may mitigate this risk of failure. If the updated fabrication model 412 brings the object within tolerance, then it is printed. Otherwise, further iterations of the process 200 may produce further updated fabrication models (e.g., model 414) with increasingly dense infills until the object is within acceptable tolerance. In some implementations, modifying the density of the object or a portion thereof can include using a denser in-fill pattern, using a greater number of shells to fabricate the object or portion thereof, etc.

Figure 5A:
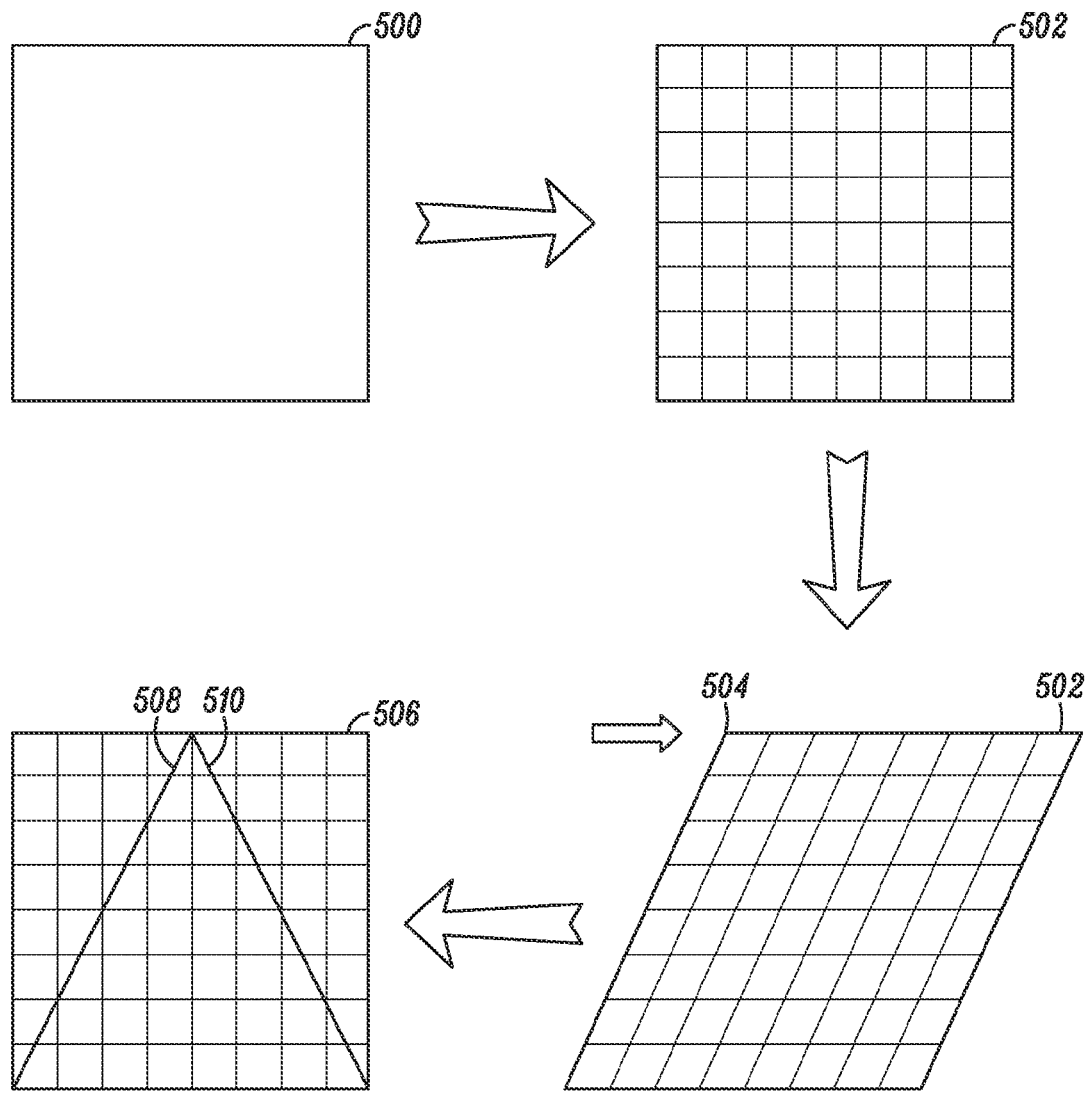

FIG. 5A shows another exemplary instance of printing an object according to the techniques described in FIG. 2. In this example, the source model describes an object having no specified infill. The object, shown as a cross-section in FIG. 5, has the shape of a rectangular box. A straightforward preliminary infill in the form of a polygonal mesh of uniform density is added, giving rise to a preliminary fabrication model 502.

However, a structural analysis may reveal that the object of model 502 may in danger of failure by shearing, if a force is applied in the direction of the arrow at the point 504. If the force required to produce the failure is outside the tolerance range, an updated fabrication model 506, with support structures 508, 510 may mitigate the risk of failure.

Figure 5B:
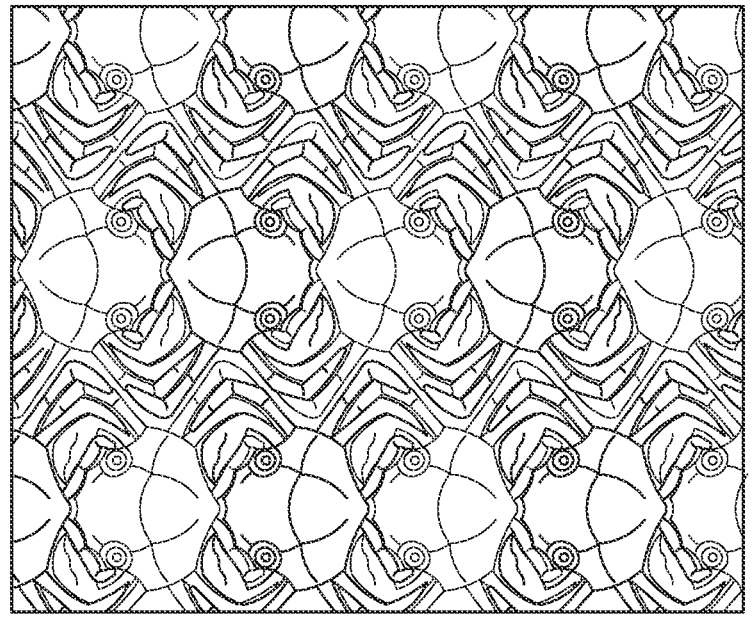
Figure 5B:
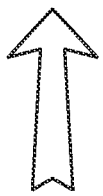
Figure 5B:
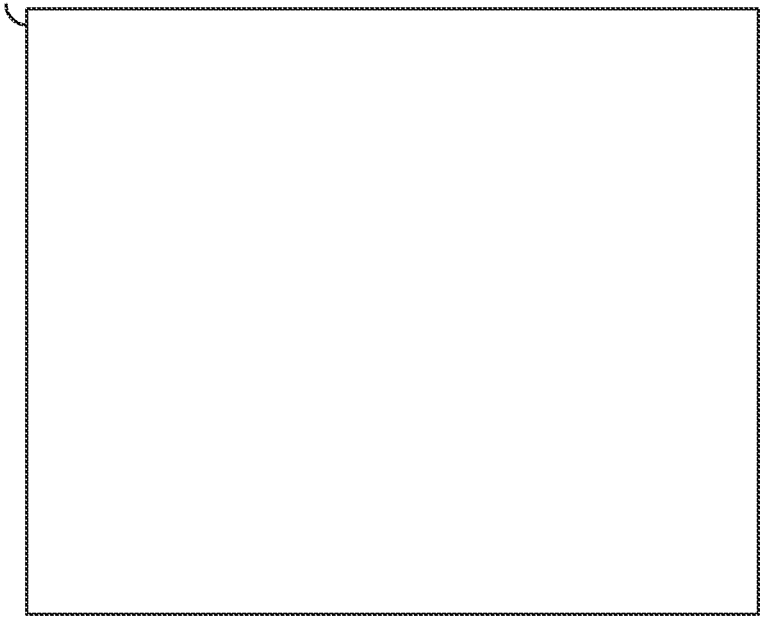

Alternatively, FIG. 5B shows another modification that may mitigate the risk of sheer. The cells of the infill are replaced with a geometry that is not susceptible to sheer in the same direction as the surface of the object in model 500. Namely . . . crabs!

Figure 6:
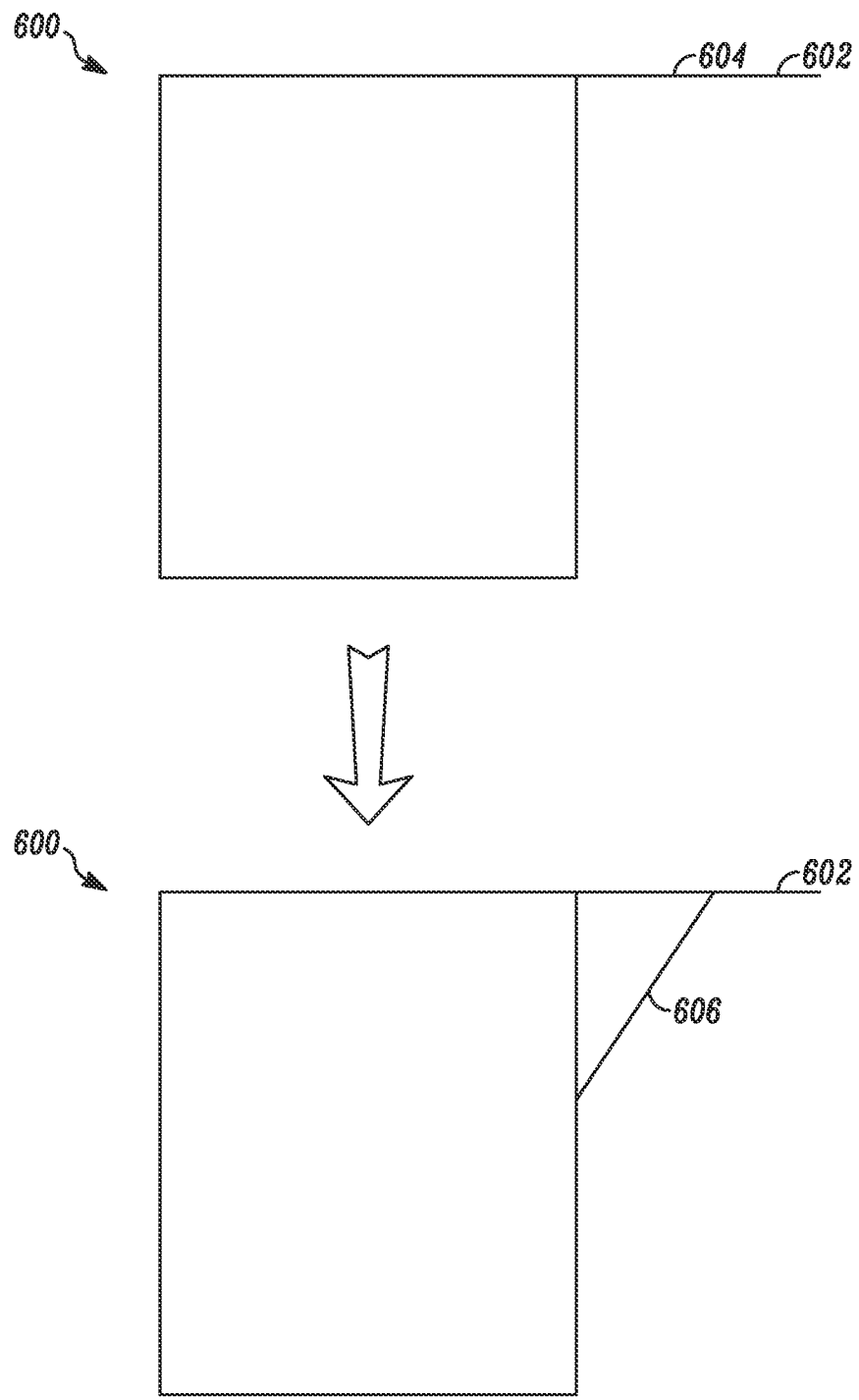

FIG. 6 shows a further exemplary instance of printing an object according to the techniques described in FIG. 2. In this example, the source model 600 describes an object having a ledge 602. Irrespective of any preliminary infill, a structural analysis may reveal that the ledge may be in danger of breaking at the critical point 604 under a certain load. If that load is outside the tolerance range, the model 600 can be modified to include a support structure 606, to increase the load bearing capacity of the ledge 602.

Figure 7:
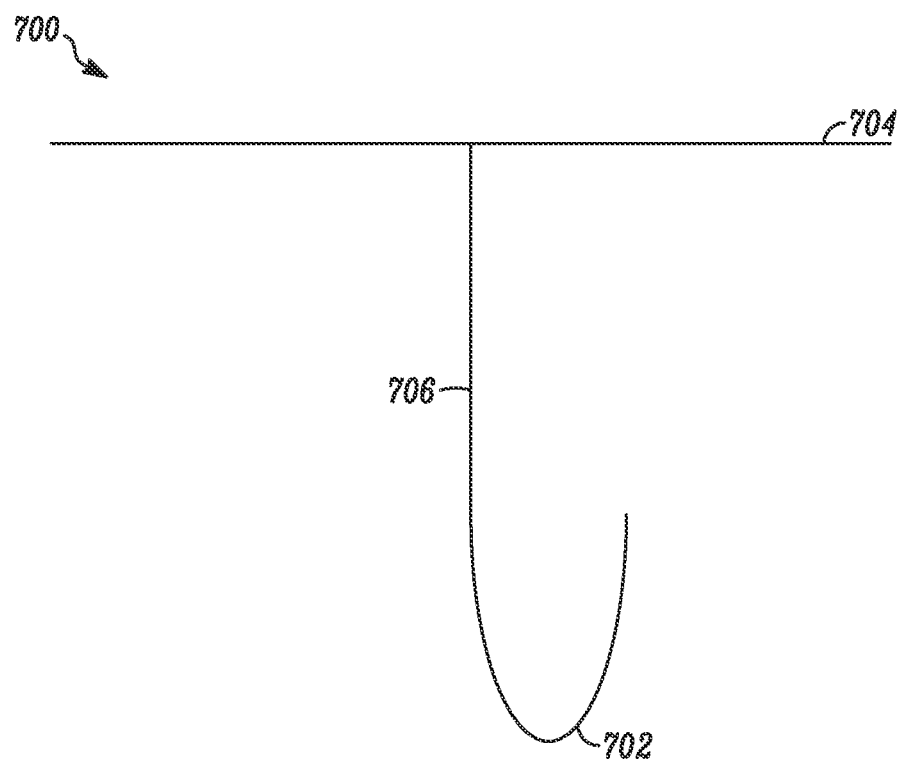

FIG. 7 shows yet another exemplary instance of printing an object according to the techniques described in FIG. 2. In this example, the source model 700 describes an object that includes a hook 702 suspended from a platform 704 by a structure 706. The structure 706 specified in the source model does not include a void, so the preliminary infill is the same as the modeled infill: namely, solid. Thus, the preliminary fabrication model is the same as the source model.

A structural analysis may reveal that the structure 706 is in danger of breaking when a load of sufficient weight is applied to the hook 702. If the weight is outside the tolerance range, the structure 706 or portion thereof may be fabricated with a greater number of shells.

The objects and modifications discussed in FIGS. 4-7 are exemplary only. Other modifications for improving structural integrity are possible in each case. In general, several modifications may be made concurrently. For example, one may use these techniques to mitigate both the risk of shear or the risk of collapse. To the extent candidate improvements are inconsistent, (e.g., improving structural integrity by using one of several candidate in-fill patterns) one may select a candidate based on optimizing other desired characteristics (e.g., minimizing build material, minimizing build time, etc.)

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
identifying a source model describing a modeled object having an outer surface;
generating a preliminary fabrication model from the source model, the preliminary fabrication model including fabrication instructions for a three-dimensional printer to fabricate the modeled object based on the source model, the modeled object including a preliminary infill that fills interior space within the modeled object with an infill pattern;
automatically performing a structural analysis on the preliminary fabrication model, the structural analysis resulting in the identification of a critical point and a corresponding failure mode at the critical point;
automatically modifying the preliminary fabrication model without changing the outer surface of the modeled object to adjust the structural integrity of the modeled object with respect to the failure mode at the critical point, thereby producing an updated fabrication model including second fabrication instructions for the three-dimensional printer to fabricate the modeled object based on the source model; and
printing the modeled object on the three dimensional printer using the second fabrication instructions in the updated fabrication model.

2. The method of claim 1, wherein identifying the preliminary fabrication model includes using an algorithm to fill voids in the source model.

3. The method of claim 1, wherein identifying the preliminary fabrication model includes accounting for physical properties of the object that are not accounted for in the source model.

4. The method of claim 3, wherein identifying the preliminary fabrication model accounts for physical properties resulting from at least one manufacturing technique selected from the group consisting of fused deposition modeling, multijet printing, stereolithography, digital light processor printing, and selective laser sintering.

5. The method of claim 1, wherein modifying the preliminary fabrication model includes modifying the infill pattern.

6. The method of claim 5, wherein modifying the infill pattern includes adjusting an infill density.

7. The method of claim 5, wherein modifying the infill pattern includes altering the infill geometry.

8. The method of claim 1, wherein modifying the preliminary fabrication model includes adding a support structure.

9. The method of claim 1, wherein modifying the preliminary fabrication model includes modifying a number of shells used to fabricate a portion of the modeled object.

10. A system comprising:
one or more processors;
a memory bearing instructions that, when executed, cause the one or more processors to:
identifying a source model describing a modeled object having an outer surface;

generating a preliminary fabrication model from the source model, the preliminary fabrication model including fabrication instructions for a three-dimensional printer to fabricate the modeled object based on the source model, the modeled object including a preliminary infill that fills interior space within the modeled object with an infill pattern;

automatically performing a structural analysis on the preliminary fabrication model, the structural analysis resulting in the identification of a critical point and a corresponding failure mode at the critical point;

automatically modifying the preliminary fabrication model without changing the outer surface of the modeled object to adjust the structural integrity of the modeled object with respect to the failure mode at the critical point, thereby producing an updated fabrication model including second fabrication instructions for the three-dimensional printer to fabricate the modeled object based on the source model; and printing the modeled object on the three dimensional printer using the second fabrication instructions in the updated fabrication model.

11. The system of claim 10, wherein identifying the preliminary fabrication model includes using an algorithm to fill voids in the source model.

12. The system of claim 10, wherein identifying the preliminary fabrication model includes accounting for physical properties of the object that are not accounted for in the source model.

13. The system of claim 12, wherein identifying the preliminary fabrication model accounts for physical properties resulting from at least one manufacturing technique selected from the group consisting of fused deposition modeling, multijet printing, stereolithography, digital light processor printing, and selective laser sintering.

14. The system of claim 10, wherein modifying the preliminary fabrication model includes modifying the infill pattern.

15. The system of claim 14, wherein modifying the infill pattern includes adjusting an infill density.

16. The system of claim 14, wherein modifying the infill pattern includes altering the infill geometry.

17. The system of claim 10, wherein modifying the preliminary fabrication model includes adding a support structure.

18. The system of claim 10, wherein modifying the preliminary fabrication model includes modifying a number of shells used to fabricate a portion of the modeled object.

19. A nontransitory computer readable medium bearing instructions that, when executed, cause a computing device to:

identify a source model describing a modeled object having an outer surface;

generate a preliminary fabrication model from the source model, the preliminary fabrication model including fabrication instructions for a three-dimensional printer to fabricate the modeled object based on the source model, the modeled object including a preliminary infill that fills interior space within the modeled object with an infill pattern;

automatically perform a structural analysis on the preliminary fabrication model, the structural analysis resulting in the identification of a critical point and a corresponding failure mode at the critical point;

automatically modify the preliminary fabrication model without changing the outer surface of the modeled object to adjust the structural integrity of the modeled object with respect to the failure mode at the critical point, thereby producing an updated fabrication model including second fabrication instructions for the three-dimensional printer to fabricate the modeled object based on the source model; and print the modeled object on the three dimensional printer using the second fabrication instructions in the updated fabrication model.

20. The medium of claim 19, wherein identifying the preliminary fabrication model includes using an algorithm to fill voids in the source model.

21. The medium of claim 19, wherein identifying the preliminary fabrication model includes accounting for physical properties of the object that are not accounted for in the source model.

22. The medium of claim 21, wherein identifying the preliminary fabrication model accounts for physical properties resulting from at least one manufacturing technique selected from the group consisting of fused deposition modeling, multijet printing, stereolithography, digital light processor printing, and selective laser sintering.

23. The medium of claim 19, wherein modifying the preliminary fabrication model includes modifying the infill pattern.

24. The medium of claim 23, wherein modifying the infill pattern includes adjusting an infill density.

25. The medium of claim 23, wherein modifying the infill pattern includes altering the infill geometry.

26. The medium of claim 19, wherein modifying the preliminary fabrication model includes adding a support structure.

27. The medium of claim 19, wherein modifying the preliminary fabrication model includes modifying a number of shells used to fabricate a portion of the modeled object.

* * * * *